US011860726B2

(12) United States Patent
Mandal et al.

(10) Patent No.: US 11,860,726 B2
(45) Date of Patent: Jan. 2, 2024

(54) RECOMMENDING REMEDIATION ACTIONS FOR INCIDENTS IDENTIFIED BY PERFORMANCE MANAGEMENT SYSTEMS

(71) Applicant: Healtech Software India Pvt. Ltd., Bangalore (IN)

(72) Inventors: Atri Mandal, Bangalore (IN); Palavali Shravan Kumar Reddy, Bangalore (IN); Sudhir Shetty, Bangalore (IN); Adityam Ghosh, Bangalore (IN); Shainy Merin, Bangalore (IN); Raja Shekhar Mulpuri, Bangalore (IN); Howard Zhang, Winchester, MA (US)

(73) Assignee: Healtech Software India Pvt. Ltd., Karnataka (IN)

( * ) Notice: Subject to any disclaimer, the term of this patent is extended or adjusted under 35 U.S.C. 154(b) by 0 days.

(21) Appl. No.: 17/652,099

(22) Filed: Feb. 23, 2022

(65) Prior Publication Data
US 2023/0267033 A1    Aug. 24, 2023

(51) Int. Cl.
*G06F 11/07* (2006.01)
*G06N 5/02* (2023.01)
*G06F 11/34* (2006.01)

(52) U.S. Cl.
CPC ........ *G06F 11/0793* (2013.01); *G06F 11/079* (2013.01); *G06F 11/3409* (2013.01); *G06N 5/02* (2013.01)

(58) Field of Classification Search
CPC .............. G06F 11/0793; G06F 11/079; G06F 11/3409; H04L 41/5074; G06N 5/02
See application file for complete search history.

(56) References Cited

U.S. PATENT DOCUMENTS

| 11,422,882 B1* | 8/2022 | Chhabra ............... G06F 11/327 |
| 2012/0158633 A1 | 6/2012 | Eder |
| 2016/0321126 A1 | 11/2016 | Burugula et al. |

(Continued)

OTHER PUBLICATIONS

International Search Report and Written Opinion for International Patent Application No. PCT/IB2023/051656, dated Jun. 22, 2023, 6 pages.

*Primary Examiner* — Yolanda L Wilson
(74) *Attorney, Agent, or Firm* — IPHORIZONS PLLC; Narendra Reddy Thappeta

(57) ABSTRACT

According to an aspect, a (recommendation) system constructs a knowledge graph based on problem descriptors and remediation actions contained in multiple incident reports previously received from a performance management (PM) system. Each problem descriptor and remediation action in an incident report are represented as corresponding start node and end node in the knowledge graph, with a set of qualifier entities in the incident report represented as causal links between the start node and the end node. Upon receiving an incident report related to an incident identified by the PM system, the system extracts a problem descriptor and a set of qualifier entities. The system traverses the knowledge graph starting from a start node corresponding to the extracted problem descriptor using the set of qualifier entities to determine end nodes representing a set of remediation actions. The system provides the set of remediation actions as recommendations for resolving the incident.

20 Claims, 11 Drawing Sheets

(56) References Cited

U.S. PATENT DOCUMENTS

| | | | |
|---|---|---|---|
| 2017/0353991 A1 | 12/2017 | Tapia | |
| 2018/0253736 A1* | 9/2018 | Rajaram | G06Q 30/016 |
| 2019/0089577 A1* | 3/2019 | Misra | G06N 20/00 |
| 2020/0409810 A1* | 12/2020 | Wu | G06F 11/2257 |
| 2021/0342857 A1* | 11/2021 | Tzur | G06N 5/01 |
| 2022/0101148 A1* | 3/2022 | Lin | G06N 20/20 |

* cited by examiner

| | Application | Service/component | instance_id | kpi_id | kpi_name | Actual value | Upper Limit | Lower Limit |
|---|---|---|---|---|---|---|---|---|
| 411 → | Online-Reservation | Frontend | Web | 333 | Response time | 400 | 10 | 4 |
| 412 → | Online-Reservation | Database | Oracle | 837 | Memory Util | 151 | 120 | 50 |
| 413 → | Online-Reservation | Infra | VM1 | 412 | Memory Util | 2000 | 2000 | 300 |

*FIG. 4A*

Incident Report #1

Today at around 2PM, multiple applications were loaded onto a single VM causing the DB service of Online-Reservation system to be not responsive. The DB service has been moved to a separate instance.

Additional Info: DB service type: Oracle, Problem category: High Memory Utility

420

Incident Report #2

Oracle DB service of the Hotel-Search application had slow responsive times from 3am to 4am on Sunday (2-Feb-2022) due to a deadlock. The DB instance was restarted to fix the issue.

430

Incident Report #3

On 6th of Oct-21, early morning, upgrade activity of network switches (NXOS) was performed in BCP Data Center. This has impacted NG RTGS (which was running from DR) between 1:45 am to 3:30 am. RTGS Txns were rejected as receiver went into inactive status due to network fluctuation. We have recycled our services to start txn processing.

| Entity Extraction | |
|---|---|
| Entity Name | Value |
| Time | On 6th of Oct-21, early morning |
| Root cause | upgrade activity of network switches (NXOS) was performed in BCP Data Center |
| Symptom | This has impacted NG RTGS (which was running from DR) between 1:45 am to 3:30 am. RTGS Txns were rejected as receiver went into inactive status due to network fluctuation. |
| Resolution | We have recycled our services to start txn processing. |

450

On [B-Time] 6th of [I-Time] Oct-21, early morning, [B-RC] upgrade [I-RC] activity [I-RC] of [I-RC] network [I-RC] switches were performed in [B-LOC] BCP [I-LOC] Data [I-LOC] Center. This has [B-SYM] impacted [I-SYM]NG [I-SYM] RTGS (which was running from DR) between [B-TIME] 1:45 am to [I-TIME] 3:30 am. [B-SYM] RTGS [I-SYM]Txns were [I-SYM] rejected as receiver went into inactive status due to network fluctuation. We have [B-RES] recycled our [I-RES] services to [I-RES] start [I-RES] txn [I-RES] processing.

Incident Report #10

Oracle DB service used by the web service application had responsive times greater than expected. Possible problem may be locking of resources.

610

| Entity Extraction | |
|---|---|
| Entity Name | Value |
| Root cause | DB service is not responsive |
| Symptom | Responsive times greater than expected |
| Component | DB service |
| Sub-Component | Oracle |
| Problem Type | Locking of resources |

RECOMMENDING REMEDIATION ACTIONS FOR INCIDENTS IDENTIFIED BY PERFORMANCE MANAGEMENT SYSTEMS

BACKGROUND OF THE DISCLOSURE

Technical Field

The present disclosure relates to computing infrastructures and more specifically to recommending remediation actions for incidents identified by performance management systems.

Related Art

Performance management (PM) Systems are often deployed to aid in the management of the performance of computing environments hosting one or more software applications or components thereof. Performance management entails examination of inputs (user requests), outputs (responses to user requests) and resource usage of a computing environment while predicting metrics relevant to performance. The resources can be infrastructure resources such as compute/CPU, memory/RAM, disk/file storage, etc., or application resources such as database connections, application threads, etc.

PM systems often identify incidents that are of potential interest to the administrators of the computing environments. Incidents indicate performance situations such as degradation in performance, resources are under or overallocated, or faults such as freezing or reboot of systems, etc. The identified incidents can be those that actually occurred in the computing environment or those predicted to occur by the PM systems.

Remediation actions are performed to correct the incidents identified by the PM systems. Remediation actions typically involve allocating/deallocating additional resources, restarting the systems, reorganizing the hosting of the software applications or components thereof, etc.

Aspects of the present disclosure are directed to recommending remediation actions for incidents identified by performance management systems.

BRIEF DESCRIPTION OF THE DRAWINGS

Example embodiments of the present disclosure will be described with reference to the accompanying drawings briefly described below.

FIG. 4A depicts sample incidents identified by a performance management system in one embodiment.

FIG. 4B depicts sample (historical) incident reports raised by a an ITSM tool in one embodiment.

FIG. 4C illustrates the manner in which entities are extracted from incident reports in one embodiment.

FIG. 6A depicts the manner in which an incident report sought to be resolved is processed in one embodiment.

In the drawings, like reference numbers generally indicate identical, functionally similar, and/or structurally similar elements. The drawing in which an element first appears is indicated by the leftmost digit(s) in the corresponding reference number.

DETAILED DESCRIPTION OF THE EMBODIMENTS OF THE DISCLOSURE

1. Overview

Figure 1:
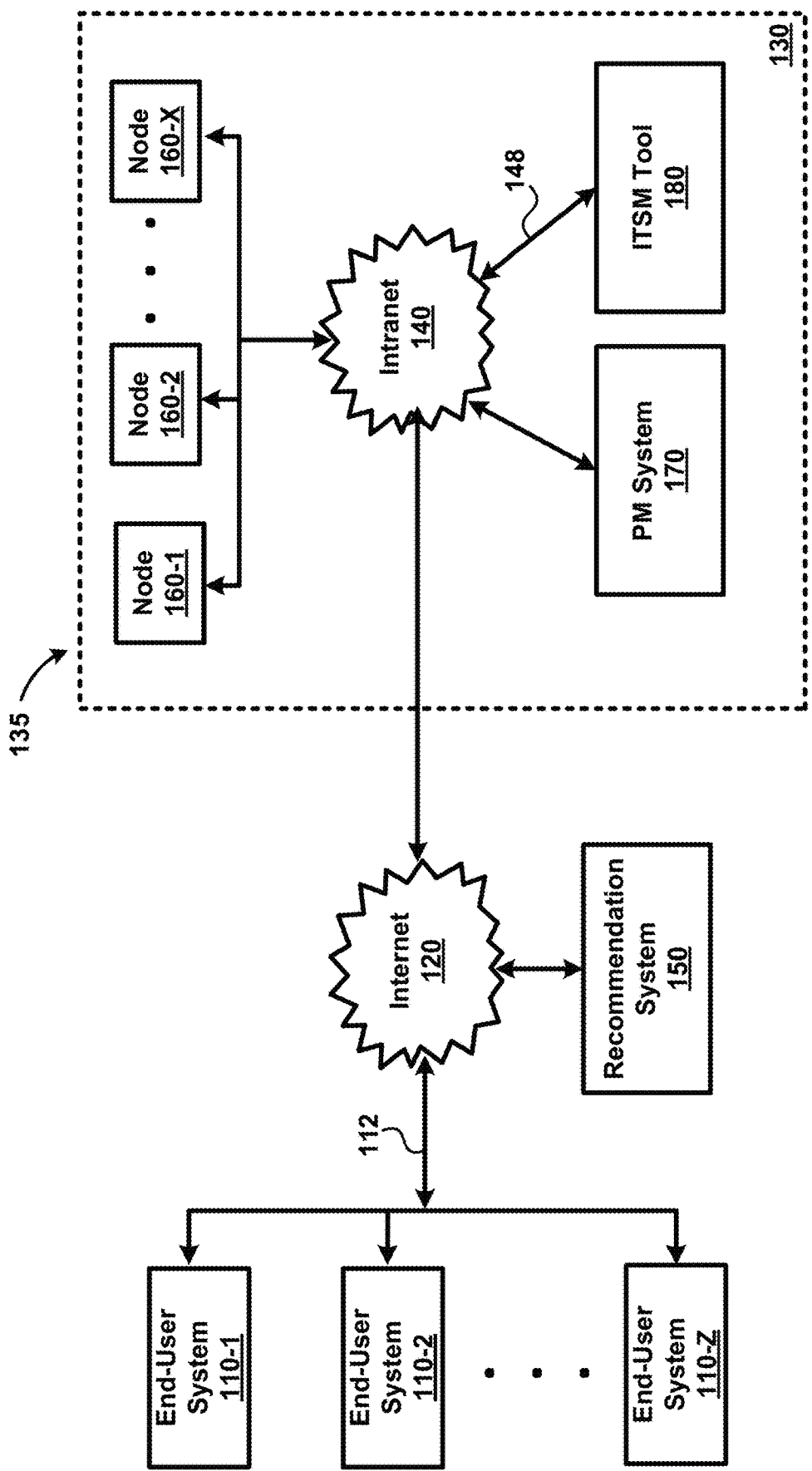
FIG. 1 is a block diagram illustrating an example environment in which several aspects of the present disclosure can be implemented.

An aspect of the present disclosure is directed to recommending remediation actions. In one embodiment, a (recommendation) system constructs a knowledge graph based on problem descriptors and remediation actions contained in multiple incident reports previously received from a performance management (PM) system. Each problem descriptor and remediation action in an incident report are represented as corresponding start node and end node in the knowledge graph, with a set of qualifier entities in the incident report represented as causal links between the start node and the end node. Upon receiving a first incident report related to a first incident identified by the PM system, the system extracts a first problem descriptor and a first set of qualifier entities. The system traverses the knowledge graph starting from a start node corresponding to the first problem descriptor using the first set of qualifier entities to determine end nodes representing a first set of remediation actions. The system provides the first set of remediation actions as recommendations for resolving the incident.

According to another aspect of the present disclosure, the system maintains a respective confidence score associated with each path from the first problem descriptor to each of the first set of remediation actions, wherein the confidence score for a path represents a likelihood of resolution of the first problem descriptor by the corresponding remediation action. The system identifies rankings for the first set of remediation actions based on the associated confidence scores and also provides the identified rankings along with the first set of remediation actions.

According to one more aspect of the present disclosure, the system also extracts a second problem descriptor with a second weight along with the first problem descriptor with a first weight. The system traverses the knowledge graph to determine a second set of remediation actions and associated confidence scores for the second problem descriptor. The system then rankings for both of the first set of remediation actions and the second set of remediation actions together based on associated confidence scores weighted by the respective first weight and second weight.

According to yet another aspect of the present disclosure, the system classifies the first incident as being one of a short head incident and a long tail incident. If the first incident is classified as short head incident, the system provides the first set of remediation actions as recommendations. If the first incident is classified as long tail incident, the system performs a web search to determine a third set of remediation actions and then provides the third set of remediation actions as recommendations for resolving the first incident.

According to an aspect of the present disclosure, the system performs the classifying by generating a machine learning (ML) model correlating a set of problem types contained in the multiple incident reports (received from the PM system) to a number of occurrences of each problem type in the knowledge graph, and then predicting using the ML model, whether the first incident is one of the short head incident and the long tail incident based on a first problem type determined for the first incident.

According to another aspect of the present disclosure, the system combines the first set of remediation actions and the third set of remediation actions to generate a final set of remediation actions. The system provides the final set of remediation actions as recommendations for resolving the first incident.

According to one more aspect of the present disclosure, the first problem descriptor is one of a root cause of the first incident and a symptom caused by the first incident. The first set of qualifier entities includes one or more of a performance metric associated with the first incident, a component of an application where the first incident occurred, a sub-component of the application where the first incident occurred, a location of a server hosting the component, and a problem type determined for the first incident. The first set of qualifier entities also includes the symptom when the problem descriptor is the root cause, and the root cause when the problem descriptor is the symptom.

Several aspects of the present disclosure are described below with reference to examples for illustration. However, one skilled in the relevant art will recognize that the disclosure can be practiced without one or more of the specific details or with other methods, components, materials and so forth. In other instances, well-known structures, materials, or operations are not shown in detail to avoid obscuring the features of the disclosure. Furthermore, the features/aspects described can be practiced in various combinations, though only some of the combinations are described herein for conciseness.

2. Example Environment

FIG. 1 is a block diagram illustrating an example environment in which several aspects of the present disclosure can be implemented. The block diagram is shown containing end-user systems 110-1 through 110-Z (Z representing any natural number), Internet 120, computing infrastructure 130 and model evaluator 150. Computing infrastructure 130 in turn is shown containing intranet 140, nodes 160-1 through 160-X (X representing any natural number), performance management (PM) system 170 and ITSM (IT Service Management) tool 180. The end-user systems and nodes are collectively referred to by 110 and 160 respectively.

Merely for illustration, only representative number/type of systems are shown in FIG. 1. Many environments often contain many more systems, both in number and type, depending on the purpose for which the environment is designed. Each block of FIG. 1 is described below in further detail.

Computing infrastructure 130 is a collection of nodes (160) that may include processing nodes, connectivity infrastructure, data storages, administration systems, etc., which are engineered to together host software applications. Computing infrastructure 130 may be a cloud infrastructure (such as Amazon Web Services (AWS) available from Amazon-.com, Inc., Google Cloud Platform (GCP) available from Google LLC, etc.) that provides a virtual computing infrastructure for various customers, with the scale of such computing infrastructure being specified often on demand.

Alternatively, computing infrastructure 130 may correspond to an enterprise system (or a part thereof) on the premises of the customers (and accordingly referred to as "On-prem" infrastructure). Computing infrastructure 130 may also be a "hybrid" infrastructure containing some nodes of a cloud infrastructure and other nodes of an on-prem enterprise system.

All the nodes (160) of computing infrastructure 130, PM system 170 and ITSM tool 180 are connected via intranet 140. Internet 120 extends the connectivity of these (and other systems of the computing infrastructure) with external systems such as end-user systems 110. Each of intranet 140 and Internet 120 may be implemented using protocols such as Transmission Control Protocol (TCP) and/or Internet Protocol (IP), well known in the relevant arts.

In general, in TCP/IP environments, a TCP/IP packet is used as a basic unit of transport, with the source address being set to the TCP/IP address assigned to the source system from which the packet originates and the destination address set to the TCP/IP address of the target system to which the packet is to be eventually delivered. An IP packet is said to be directed to a target system when the destination IP address of the packet is set to the IP address of the target system, such that the packet is eventually delivered to the target system by Internet 120 and intranet 140. When the packet contains content such as port numbers, which specifies a target application, the packet may be said to be directed to such application as well.

Each of end-user systems 110 represents a system such as a personal computer, workstation, mobile device, computing tablet etc., used by users to generate (user) requests directed to software applications executing in computing infrastructure 130. A user request refers to a specific technical request (for example, Universal Resource Locator (URL) call) sent to a server system from an external system (here, end-user system) over Internet 120, typically in response to a user interaction at end-user systems 110. The user requests may be generated by users using appropriate user interfaces (e.g., web pages provided by an application executing in a node, a native user interface provided by a portion of an application downloaded from a node, etc.).

In general, an end-user system requests a software application for performing desired tasks and receives the corresponding responses (e.g., web pages) containing the results of performance of the requested tasks. The web pages/ responses may then be presented to a user by a client application such as the browser. Each user request is sent in the form of an IP packet directed to the desired system or software application, with the IP packet including data identifying the desired tasks in the payload portion.

Some of nodes 160 may be implemented as corresponding data stores. Each data store represents a non-volatile (persistent) storage facilitating storage and retrieval of data by software applications executing in the other systems/nodes of computing infrastructure 130. Each data store may be implemented as a corresponding database server using relational database technologies and accordingly provide storage and retrieval of data using structured queries such as SQL (Structured Query Language). Alternatively, each data store may be implemented as a corresponding file server providing storage and retrieval of data in the form of files organized as one or more directories, as is well known in the relevant arts.

Some of the nodes 160 may be implemented as corresponding server systems. Each server system represents a server, such as a web/application server, constituted of appropriate hardware executing software applications capable of performing tasks requested by end-user systems 110. A server system receives a user request from an end-user system and performs the tasks requested in the user request. A server system may use data stored internally (for example, in a non-volatile storage/hard disk within the server system), external data (e.g., maintained in a data store) and/or data received from external sources (e.g., received from a user) in performing the requested tasks. The server system then sends the result of performance of the tasks to the requesting end-user system (one of 110) as a corresponding response to the user request. The results may be accompanied by specific user interfaces (e.g., web pages) for displaying the results to a requesting user.

In one embodiment, software applications containing one or more components are deployed in nodes 160 of computing infrastructure 130. Examples of such software include, but are not limited to, data processing (e.g., batch processing, stream processing, extract-transform-load (ETL)) applications, Internet of things (IoT) services, mobile applications, and web applications. Computing infrastructure 130 along with the software applications deployed there is viewed as a computing environment (135).

It may be appreciated that each of nodes 160 has a fixed number of resources such as memory (RAM), CPU (central processing unit) cycles, persistent storage, etc. that can be allocated to (and accordingly used by) software applications (or components thereof) executing in the node. Other resources that may also be provided associated with the computing infrastructure (but not specific to a node) include public IP (Internet Protocol) addresses, etc. In addition to such infrastructure resources, application resources such as database connections, application threads, etc. may also be allocated to (and accordingly used by) the software applications (or components thereof). Accordingly, it may be desirable to monitor and manage the resources consumed by computing environment 135C.

PM system 170 aids in the management of the performance of computing environment 135C, in terms of managing the various resources noted above. Broadly, PM system 170 is designed to process time series of values of various data types characterizing the operation of nodes 160 while processing user requests. The data types can span a variety of data, for example, performance metrics (such as CPU utilization, memory used, storage used, etc.), logs, traces, topology, etc. Based on processing of such values of potentially multiple data types, PM system 170 predicts expected values of performance metrics of interest at future time instances. PM system 170 also identifies potential issues (shortage of resources, etc.) in computing environment 135 based on such predicted expected values and/or actual values received from nodes 160 and triggers corresponding alerts for the identified issues. In the instant description, the term "incident" refers to such an identified potential issue that is triggered as an alert by PM system 170.

In one embodiment, PM system 170 uses ML (machine learning) based or DL (deep learning) based approaches for co-relating the performance metrics (with time instances or user requests received from end user system 110) and predicting the issues/violations for the performance metrics. Examples of machine learning (ML) approaches are KNN (K Nearest Neighbor), Decision Tree, etc., while deep learning approaches are Multilayer Perceptron (MLP), Convolutional Neural Networks (CNN), Long short-term memory networks (LSTM) etc. Such PM systems that employ AI (artificial intelligence) techniques such as ML/DL for predicting the outputs are also referred to as AIOps (AI for IT operations) systems.

ITSM tool 180 facilitates IT managers such as administrators, SREs, etc. to provide end-to-end delivery of IT services (such as software applications) to customers. To facilitate such delivery, ITSM tool 180 receives the alerts/incidents triggered by PM system 170 and raises corresponding tickets/incident reports for the attention of the IT managers. ITSM tool 180 also maintains the raised incident reports in a non-volatile storage such as a data store (e.g., one of nodes 160). Examples of ITSM tool 180 are ServiceNow software available from ServiceNow[R], Helix ITSM (previously Remedy ITSM) software available from BMC Software, Inc, etc.

It should be noted that at the time when the incident reports are raised by ITSM tool 180, the incident reports contain details related to the incident such as the symptom caused by the incident, a performance metric associated with the incident, a component/sub-component of an application where the incident occurred, etc. An administrator/SRE may thereafter manually add (using end user systems 110 to send requests to ITSM tool 180) additional details related to the incident such as the root cause of the incident, problem type of incident, etc. based on further investigation. After manually determining and performing any remediation actions to resolve the incident, the administrator/SRE may also add the details of the remediation actions to the incident report.

In one embodiment, the incident reports/tickets in ITSM tool 180 are associated with different levels (such as level 0 or L0, level 1 or L1 and level 2 or L2) indicating the difficulty and/or importance of the incident. For L0 incident reports, an administrator/SRE typically manually performs one or more searches (using keywords obtained from the new incident report) on the previously raised and resolved incident reports and determine any remediation actions based on the results of the searches. However, for L1 and L2 incident reports, a sequence of actions may need to be performed to diagnose/resolve the incident completely and typically requires the involvement of one or more domain experts. It may be appreciated that when the number of incident reports increases (more that 10,000+), it may not be feasible to determine the remediation actions based on manual searches (even for L0 tickets). In addition, the involvement of domain knowledge experts may cause delays in the resolving of the L2/L3 tickets.

Recommendation system 150, provided according to several aspects of the present disclosure, recommends remediation actions for incidents identified by PM systems (170) deployed in a computing environment (135C). Though shown external to computing infrastructure 130, in alternative embodiments, recommendation system 150 may be implemented internal to computing infrastructure 130, for example, on one of nodes 160 or as a system connected to intranet 140. The manner in which recommendation system 150 recommends remediation actions is described below with examples.

3. Recommending Remediation Actions

Figure 2:
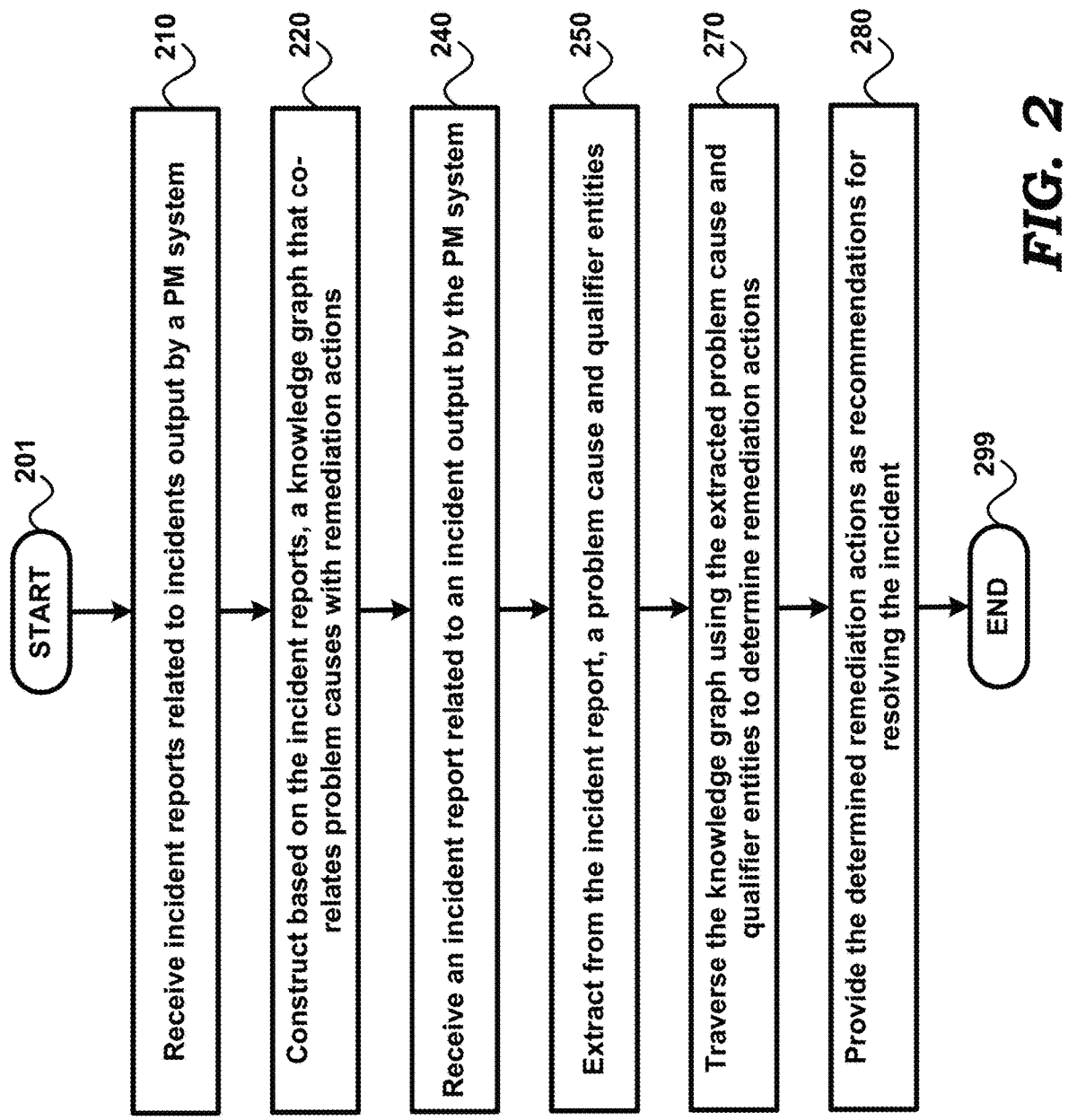
FIG. 2 is a flow chart illustrating the manner in which remediation actions are recommended for incidents identified by performance management systems according to several aspects of the present disclosure.

FIG. 2 is a flow chart illustrating the manner in which remediation actions are recommended for incidents identified by performance management systems (e.g., PM system 170) according to several aspects of the present disclosure. The flowchart is described with respect to the systems of FIG. 1, in particular recommendation system 150, merely for illustration. However, many of the features can be implemented in other environments also without departing from the scope and spirit of several aspects of the present invention, as will be apparent to one skilled in the relevant arts by reading the disclosure provided herein.

In addition, some of the steps may be performed in a different sequence than that depicted below, as suited to the specific environment, as will be apparent to one skilled in the relevant arts. Many of such implementations are contemplated to be covered by several aspects of the present invention. The flow chart begins in step 201, in which control immediately passes to step 210.

In step 210, recommendation system 150 receives incident reports related to incidents identified by a PM system (such as 170). The incident reports may be received from ITSM tool 180. The incident reports may be raised in ITSM tool 180 in response to receiving the incidents identified by PM system 170. Each incident report contains a corresponding problem descriptor for that incident, a remediation action performed for resolving that incident (added by an administrator/SRE), and a set of qualifier entities associated with the incident.

In the following disclosure, the term "qualifier entity" refers to concrete things and/or experiences qualifying the incident present in the incident report. A qualifier entity captures the information that replies to the questions of what, when, where, etc. as related to the incident. For example, when did the incident occur (date/time), what is the effect of the incident (symptom), where did the incident occur (component, sub-component, location), etc.

In step 220, recommendation system 150 constructs based on the incident reports, a knowledge graph that co-relates problem descriptors (contained in the incident reports) with remediation actions (contained in the incident reports). In one embodiment, each problem descriptor is represented as a corresponding start node and each remediation action is represented as a corresponding end node in the knowledge graph. The set of qualifier entities in each incident report is represented as causal links between the start node and the end node corresponding to the problem descriptor and remediation action contained in the incident report.

In step 240, recommendation system 150 receives an incident report related to an incident identified by the PM system (170). The incident report may be received from ITSM tool 180 and may be raised by ITSM tool 180 in response to receiving the incident identified PM system 170. However, the received incident report does not contain a remediation action.

In step 250, recommendation system 150 extracts from the incident report, a problem descriptor and qualifier entities. The extraction may be performed in a known way, for example, based on a pattern search within the text of the incident report.

In step 270, recommendation system 150 traverses the knowledge graph using the extracted problem descriptor and qualifier entities to determine remediation actions. In the embodiment noted above, the traversal is performed by starting from a start node corresponding to the extracted problem descriptor and then using the extracted qualifier entities to determine end nodes representing remediation actions.

In step 280, recommendation system 150 provides the determined remediation actions as recommendations for resolving the incident. The recommendations may be displayed to an administrator/SRE on a display unit (not shown) associated with any of end user systems 110. Alternatively, the recommendation may be sent, for example, as an email, to the administrator/SRE. Control passes to step 299, where the flowchart ends.

Thus, recommendation system 150 recommends remediation actions for incidents identified by a performance management system (170). It may be appreciated that providing such recommendations relieves the administrator/SRE of the burden of performing manual searches for L0 tickets. In addition, by capturing the domain knowledge expertise using a knowledge graph and using the knowledge graph to determine recommendation assists administrator/SREs to resolve L1/L2 tickets without any delays.

According to an aspect, recommendation system 150 also identifies rankings for the determined remediation actions based on the confidence scores associated with the remediation actions in the knowledge graph. Recommendation system 150 then provides the identified rankings along with the determined remediation actions to the administrator/SRE.

The manner in which recommendation system 150 provides several aspects of the present disclosure according to the steps of FIG. 2 is illustrated below with examples.

4. Illustrative Example

FIGS. 3, 4A-4C, 5, and 6A-6C illustrate the manner in which recommendation system 150 recommends remediation actions for incidents identified by a performance management system (170) in one embodiment. Each of the Figures is described in detail below.

Figure 3:
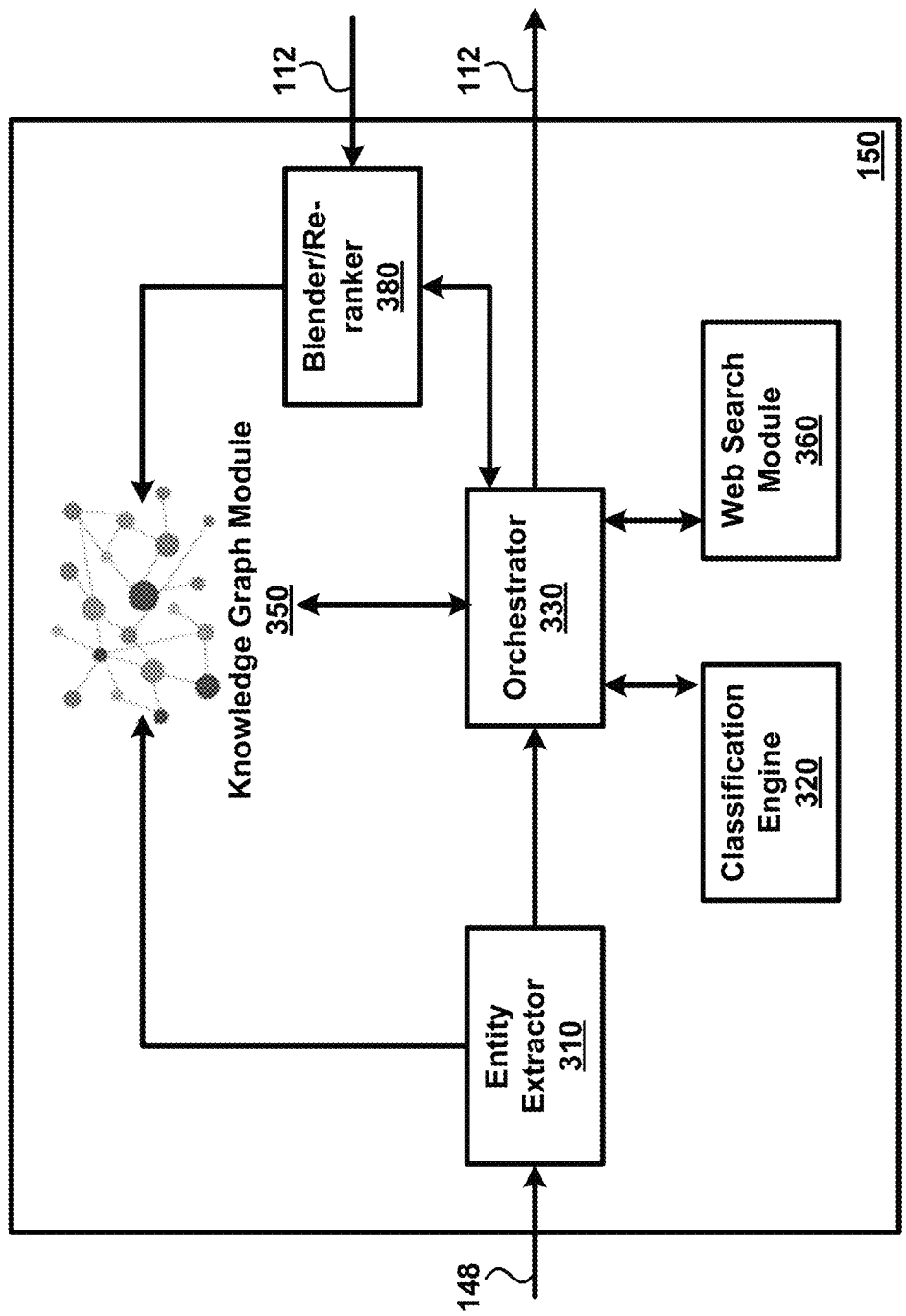
FIG. 3 is a block diagram illustrating an implementation of a recommendation system in one embodiment.

FIG. 3 is a block diagram illustrating an implementation of a recommendation system (150) in one embodiment. The block diagram is shown containing entity extractor 310, classification engine 320, orchestrator 330, knowledge graph module 350, web search module 360 and blender/reranker 380. Each of the blocks is described in detail below.

Entity extractor 310 extracts the necessary or important information from the incident reports, in particular, from the descriptions/texts contained in the incident reports. In the following disclosure, the term "entity" refers to any relevant/important information extracted from an incident report. Example of such entities are problem descriptor, remediation action, qualifier entities, etc.

Entity extractor 310 receives (via path 148) historical incident reports that have been previously generated by ITSM tool 180 at prior time instances. Each historical incident report includes the details of the incident along with work logs/notes or resolution steps (remediation actions) performed to resolve the incident. Each historical incident report may also include the feedback (relevant/irrelevant) provided by IT managers for the remediation actions recommended for previous incidents. In addition, historical incident reports may also contain topology information showing how the services (software applications or components thereof) are interconnected as well as how the services are deployed in the nodes of computing environment 135.

For each received historical incident report, entity extractor 310 extracts the problem descriptor of the incident and a resolution action performed for resolving the incident. In one embodiment, the problem descriptor is a root cause of the incident, which may be provided either by the monitoring tool (PM system 170) or by the administrators/SREs post investigation. The problem descriptor needs to be extracted from the historical incident report. Remediation actions (resolution steps) refer to the concrete steps taken by the administrators or SREs to resolve the incident.

In addition to the problem descriptor and remediation action, entity extractor 310 also extracts one or more qualifier entities from each historical incident report. Entity extractor 310 extracts qualifier entities such as what caused the incident, where the incident was caused, what type of an incident it is etc. In one embodiment, the following qualifier entities are extracted:

Symptom—Indicates the effect of the incident and is typically the basis for identifying the incident. The symptom can be extracted using natural language processing (NLP) from the description text in the incident report. For example, an extracted symptom may be "Memory utilization of db service was high for instance db01".

Performance metric—Indicates the specific metric (such as CPU utilization, memory used, storage used, etc.) that caused the incident.

Component—Indicates the component (of a software application) where the incident occurred, for example, which software application, which service (db, web, app etc.), etc.

Sub-component—Indicates the sub-component (of a software application) where the incident occurred, for example, which service (db, web, app etc.), which software module, etc.

Location—Indicates the instance/server-name/geo where the incident occurred. The location information can also be extracted from the description text or else may be present in one of the mandatory fields to be entered by the administrators/SREs in ITSM tool 180.

Problem type—Indicates the broad type or category of the incident such as database, middleware, frontend, backend, etc.

In an alternative embodiment, the symptom noted above may be determined to be the problem descriptor and accordingly the root cause may be identified as a qualifier entity and included in the set of qualifier entities. The description is continued assuming that the symptom is the problem descriptor and the set of qualifier entities includes only the component, sub-component and problem tuple for illustration. Aspects of the present disclosure may be provided with other problem descriptors and/or other sets of qualifier entities as will be apparent to one skilled in the relevant arts by reading the disclosure herein.

The manner in which entity extractor 310 extracts the various details of the historical incident reports is described below with examples.

5. Historical Incident Reports

FIG. 4A depicts sample incidents identified by a performance management system (170) in one embodiment. Table 400 depicts sample performance metrics monitored by PM system 170. Columns 401 to 405 specify the details of the performance metric (including the component and sub-component). Column 406 specifies the actual value of the performance metric captured at the nodes in the computing environment, while columns 407 and 408 specify the upper and lower limits for the performance metric. Each of rows 411-413 thus specifies the details of a corresponding incident of the performance metric causing a violation (higher than the upper limit or lower than the lower limit). PM system 170 reports these incidents (411-413) to ITSM tool 180, which in turn raises incident reports.

FIG. 4B depicts sample (historical) incident reports raised by a an ITSM tool (180) in one embodiment. Each of data portions 420, 430 and 440 represents an incident report raised by ITSM tool 180 in response to receiving incidents identified by PM system 170. For example, data potions 420 and 430 may be raised in repose to receiving the incidents in rows 412 and 413 respectively. It may be observed that the incident reports include not only the information obtained from the incident (such as the component, sub-component, performance metric, etc.), but also additional information (such as name of the database service, problem type/category, etc.) provide by administrators/SREs.

It should be noted that the incident reports in data portions 420, 430 and 440 also include the remediation actions performed to resolve the corresponding incident, and accordingly represent historical incident reports that may be used by recommendation system 150 to construct a knowledge graph as described in detail below.

Referring again to FIG. 3, entity extractor 310 receives the historical incident reports of FIG. 4B and extracts the corresponding problem descriptor, remediation action and set of qualifier entities from each historical incident report.

FIG. 4C illustrates the manner in which entities are extracted from incident reports in one embodiment. In particular, table 450 depicts the entities extracted from the incident report of data portion 440 of FIG. 4B. The entity name column indicates a pre-defined label used for each entity, while the value column indicates the value/text extracted from the incident report for the corresponding entity name. Thus, table 450 depicts the time, root cause, symptom and resolution (remediation action) extracted rom the incident report of data portion 440.

It may be appreciated that such extracted may be performed using natural language processing (NLP) techniques well known in the relevant arts. In one embodiment, a conditional random field (CRF) model/Bi-directional LSTM with CNN (CNN-Bi-LSTM) is trained on the historical incident reports to understand and extract the main entities from the unstructured text data. During inferencing without the above-mentioned labels, the model can highlight the main key components of the entities, viz. root cause, symptom, and resolution. The parameters of the model being a sequence of texts and their respective BIO-encoded label. Such a technique may require manual ground truth labeling of incident reports using the BIO encoding standards as will apparent to one skilled in the relevant arts. Data portion 460 depicts the incident report of data portion 400 after performance of BIO encoding.

Thus, recommendation system 150 (in particular, entity extractor 310) extracts the desired entities from the historical incident reports (of FIG. 4B). Recommendation system 150 then constructs s knowledge graph based on the extracted entities, as described below with examples.

6. Knowledge Graph

Referring again to FIG. 3, knowledge graph module 350 operates a knowledge hub that contains all the historical incident reports causes and effects (problem descriptors), their topology (component, sub-component, etc.) and their resolution steps (remediation actions). Knowledge graph module 350 receives (from entity extractor 310) the entities extracted from historical incident reports and constructs a knowledge graph based on the received entities such as problem descriptor, remediation action, qualifier entities, etc.

In one embodiment, each problem descriptor (such as symptom) and remediation action in an incident report are represented as corresponding start node and end node in the knowledge graph, with a set of qualifier entities (such as component, sub-component and problem type) in the incident report represented as causal links between the start node and the end node in the knowledge graph. The manner in which a knowledge graph may be constructed is described below with examples.

Figure 5:
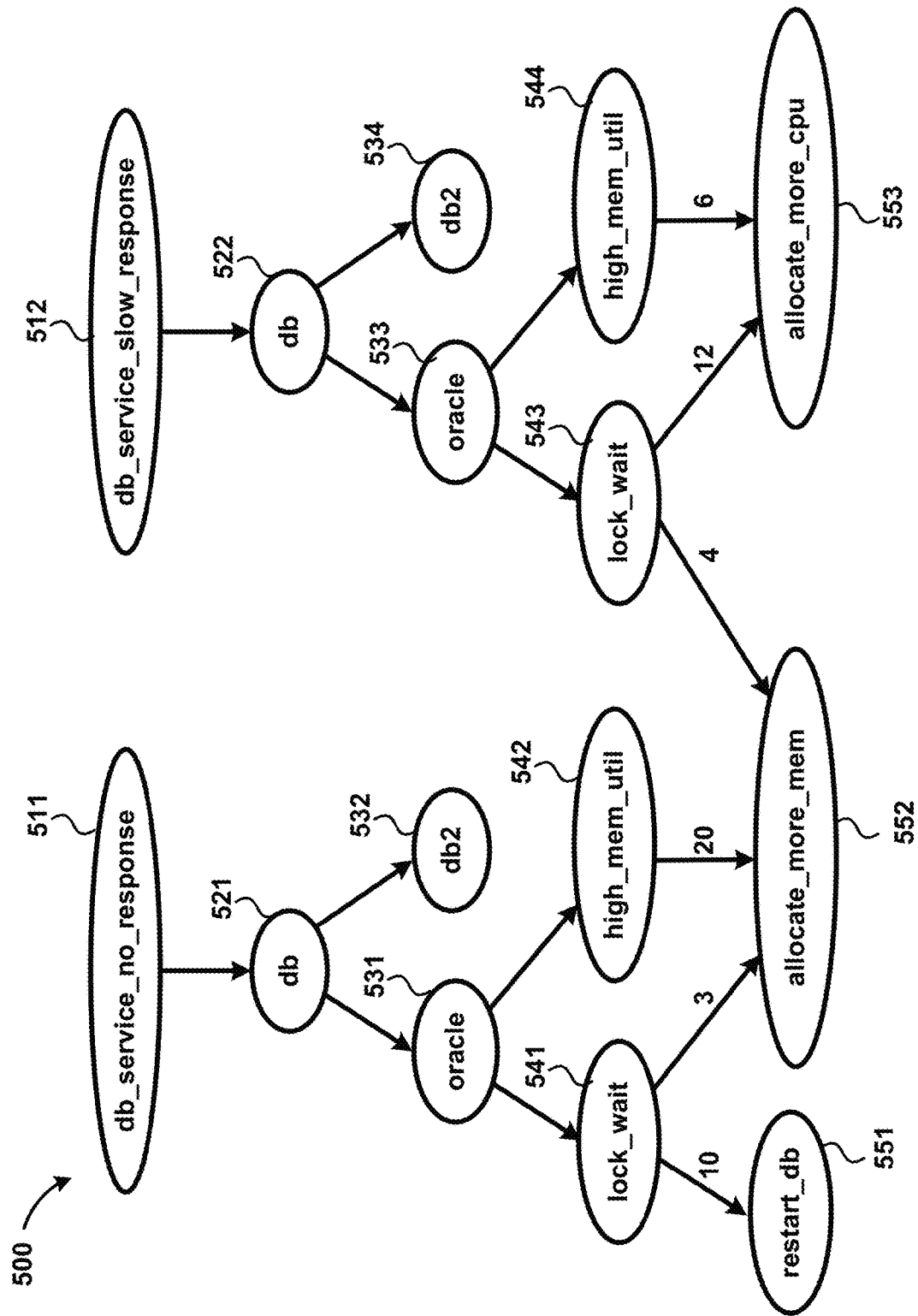
FIG. 5 depicts portions of a knowledge graph constructed based on historical incident reports in one embodiment.

FIG. 5 depicts portions of a knowledge graph (500) constructed based on historical incident reports in one embodiment. In particular, nodes 511 and 512 are start nodes representing problem descriptors and indicate the symptom text, while nodes 551, 552 and 553 are end nodes representing remediation actions (again shown as text). Nodes 521 and 522 represent the component qualifier entity and indicates the name of the component, nodes 531-534 represent the sub-component qualifier entity and indicates the name of the sub-component and nodes 541-544 represent the problem type qualifier entity and indicates the problem type in text form.

Each start node is shown connected to each end node via one or more nodes representing the set of qualifier entities extracted from a historical incident report. For example, start node 511 is shown connected to end node 551 via the nodes 521, 531 and 541 representing the qualifier entities component, sub-component and problem type respectively in a corresponding historical incident report. It is important to note that the remediation action not only depends on the symptom but also on the root cause of the problem, the component/sub-component etc. where the problem surfaced and the specific problem type/category or sub-category. In other words, the nodes representing the qualifier entities capture the various causal links (where, when, which, etc.) between a start node (symptom) and an end node (remediation action). As such, all of these entities are required to be extracted from each incident report to uniquely identify the incident and suggest a remediation action.

Each edge in knowledge graph 500 indicates that the entities represented by the two nodes connected by the edge has occurred/been present in at least one of the historical incident reports. For example, the edge between node 511 and 521 indicates that there is at least one historical incident report containing both the problem descriptor/symptom "db service no response" and the component "db". It may be appreciated that the same edge may occur multiple times in the historical incident reports.

In one embodiment, an edge weight is associated with each edge in knowledge graph 500 indicating the number of occurrences of the entities represented by the two nodes connected by the edge in the historical incident reports. For illustration, only the edge weights (10, 3, 20, etc.) for the edges between nodes 541-544 representing problem types and end nodes 551-553 representing remediation actions indicating the number of occurrences of the corresponding problem type— remediation action pairs in the historical incident reports are shown in knowledge graph 500. However, similar edge weights may be maintained for the other edges as well as will be apparent to one skilled in the relevant arts by reading the disclosure herein.

According to an aspect, the edge weights maintained as part of knowledge graph 500 is the basis for determining a respective confidence score associated with each path from a problem descriptor to a corresponding remediation action. The confidence score for a path represents a likelihood of resolution of the problem descriptor by the corresponding remediation action.

In one embodiment, instead of having text-based nodes, word embeddings are used in order to handle synonyms, semantic similarities, etc. Different embedding techniques can be used such as FastText, BERT etc. as well as sentence embedding techniques such as InferSent and USE. Also, the knowledge graph is designed in a way so as to be effective across multiple customers/tenants using computing environment 135. Accordingly, the symptoms, root cause, etc. may be stored in a canonical format so that differences in language etc. do not affect the searchability in knowledge graph 500.

Thus, recommendation system 150 constructs a knowledge graph (500) based on the entities extracted from historical incident reports. The manner in which recommendation system 150 processes a new incident report sought to be resolved (that is, does not include a remediation action) is described below with examples.

7. Processing an Incident Report

Referring again to FIG. 3, entity extractor 310 receives (via path 148) the incident report (herein after the target incident report) sought to be resolved from ITSM tool 180 and extracts the entities from the target incident report. FIG. 6A depicts the manner in which an incident report sought to be resolved is processed in one embodiment. In particular, data portion 610 represents the target incident report raised by ITSM tool 180 in response to receiving a corresponding incident identified by PM system 170. Table 620 depicts the various entities extracted by entity extractor 310 from data portion 610 using NLP techniques. It may be observed that table 620 does not contain any remediation action/resolution steps. Entity extractor 310 forwards the extracted entities to orchestrator 330.

Orchestrator 330 acts as a relay engine to the system, conveying various information to the different modules to arrive at the remediation actions for the target incident report and then provide them to a user (such as administrator/SRE). For example, orchestrator 330 coordinates with classification engine 320, knowledge graph module 350, web search module 360 as well as the blender/re-ranker 560 to generate the final recommendation (of remediation actions) for the SREs or end users. Orchestrator 330 accordingly receives the target incident report (610) and the corresponding extracted entities (620) from entity extractor 310 and then forwards the details to classification engine 320 to determine a classification of the received (target) incident. Such classification facilitates orchestrator 330 to determine the most appropriate remediation actions for the target incident.

Figure 6B:
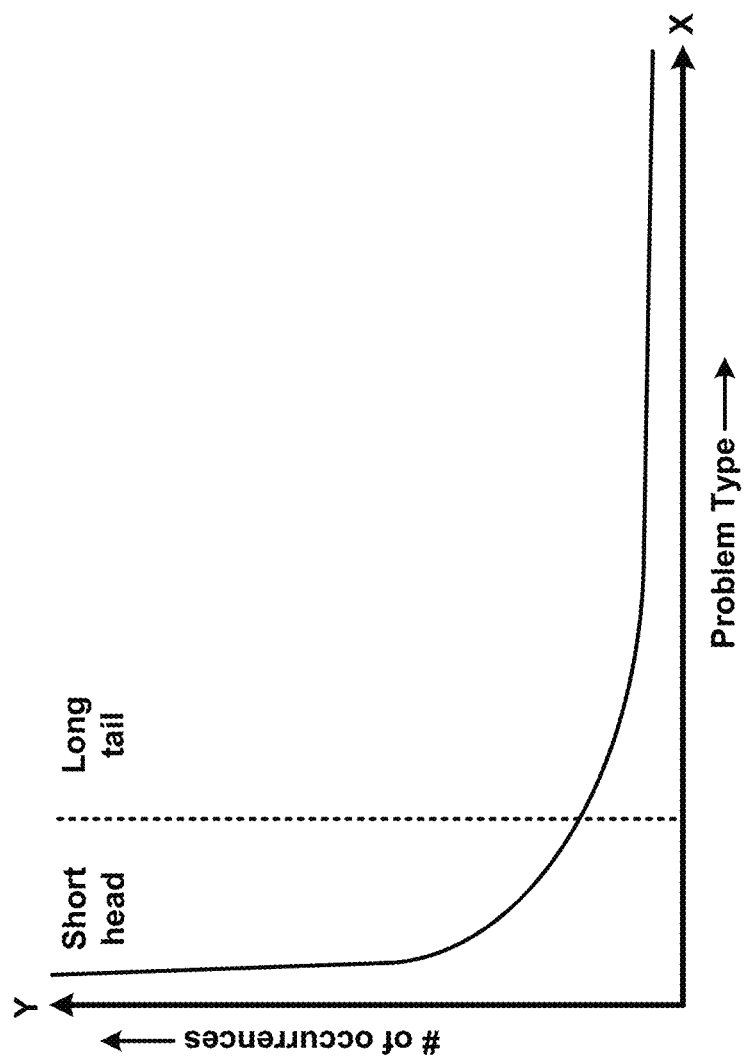
FIG. 6B illustrate the short head long tail classification in one embodiment.

Classification engine 320 is implemented to classify a received (target) incident into one or more classes. In one embodiment, classification engine 320 classifies the target incident reports as either a short head incident or a long tail incident. FIG. 6B illustrate the short head long tail classification in one embodiment. The graph is shown with the problem types along the X-axis and the number of occurrences of the problem types in the knowledge graph (500) along the Y-axis. It may be observed that a few problem types occur very frequently (left side of the dotted line) while there is a large number of problem types that occur very less frequent (right side of the dotted line). Thus, the left side of the dotted line may be viewed as a short head, while the right side forms a long tail.

In one embodiment, a pre-defined categorization technique (e.g., based on frequency of occurrence of the problem type in the target incident) is used to classify the target incident into a short head incident (e.g., high frequency of occurrence) or a long tail incident (e.g., low frequency of occurrence). According to an aspect, classification engine 320 classifies the incident using a ML model that correlating problem types contained in the historical incident reports (FIG. 4B) to a number of occurrences of each problem type in knowledge graph 500. The ML model is trained with historical incident reports. Algorithms such as k-NNs, SVMs, Deep Neural Nets may be used for classification. To handle class imbalance problem, classification engine 330 can be implemented to use up sampling/down sampling or Learning to Rank well known in the relevant arts. It may be noted that the ML model is specifically designed as a solution for the most frequently occurring problem types as there are too many training samples and the ML model can achieve high accuracy.

It may also be appreciated that during the initial phase of operation of recommendation system 150, L0 tickets/incident reports are likely to be classified as short head incidents, while L1/L2 incident reports are likely to be classified as long tail incidents. However, after continued operation during which knowledge graph 500 has been updated with substantive number of historical incident reports, even L1/L2 incident reports are likely to be classified as short head incidents and accordingly recommendation system 150 facilitates the handling of such L1/L2 incident reports by administrators/SREs without requiring any additional domain knowledge expertise.

Upon receiving the details from orchestrator 330, classification engine 320 predicts using the ML model, whether the target incident is a short head incident or a long tail incident based on a problem type extracted from the target incident report. Classification engine 320 then forwards the predicted classification to orchestrator 330. Orchestrator 330 receives the classification of the target incident and performs a knowledge graph traversal if the target incident is classified as a short head incident and a web search if the target incident is classified as a long tail incident. The knowledge graph traversal and web search are performed to determine the most appropriate remediation actions as described below with examples.

8. Determining Remedial Actions and Confidence Scores

For short head incidents, orchestrator 330 first sends a query to knowledge graph module 350, the query containing the target incident report (610) and the extracted entities (620). Knowledge graph module 350 in response to the query, performs a traversal of knowledge graph 500, comparing the nodes of the graph to the various extracted entities, to find a path that is closest to the extracted entities (620).

Specifically, the knowledge graph traversal starts from a start node representing the problem descriptor (symptom) that is closest to the problem descriptor (symptom) extracted from the target incident report. In one embodiment, a distance similarity between the extracted problem descriptor (symptom) and all the start nodes (symptoms) in knowledge graph 500 is calculated and then the best one among them is selected using the following formula:

$$y = \mathrm{argmin}(d1, d2, \ldots, dn)$$

The remediation actions associated with the closest problem descriptor (symptom) is what is included in the set of remediation actions recommend for resolving the target incident. For illustration, it is assumed that node 512 is has the shortest distance with the extracted problem descriptor/symptom ("Responsive times greater than expected").

To identify the remediation actions, knowledge graph 500 is traversed starting from the matched start node (here, 512) and following the nodes corresponding to the qualifier entities (e.g., component, sub-component, instance, etc.) extracted from the target incident report until end nodes (assumed to be 552 and 553) are reached. The remediation actions corresponding to the end nodes are identified as the set of remediation actions to be recommended. It may be noted that a remediation action (corresponding to an end node such as 552) is included in the recommendations only when the start node 512 (symptom) matches the symptom identified in the target incident report and also the other qualifier entities such as component ("db"), sub-component ("oracle") and problem type ("lock wait") match with corresponding qualifier entities in the target incident report.

According to an aspect, knowledge graph module 350 also determines a confidence score for each of the identified set of remediation action based on the corresponding edge weights (number of occurrences) maintained in knowledge graph 500. For example, the confidence score may be determined as a percentage of the total number of occurrences of the remediation actions. Thus, for node 552, the confidence score may be determined to be $4/(4+12)=4/16=0.25$, while for node 553 may be determined to be $12/(4+12)=12/16=0.75$. It may be appreciated that the higher confidence score indicates that the corresponding remediation action was successfully used a greater number of times to resolve the problem descriptor, and accordingly the likelihood of resolution of the target incident reports by the corresponding remediation action is also high.

According to an aspect, entity extractor 310 extracts multiple problem descriptors from the target incident reports. For example, from the description text of data portion 610, entity extractor 310 may extract the problem descriptors "Responsive times greater than expected" (hereinafter PD1) or "Responsive times not acceptable" (hereinafter PD2) using NLP. Such multiple extraction may be needed to take into consideration the lack of precision commonly associated with NLP. Entity extractor 310 also determines a match weight associated with each of the problem descriptors. A match weight indicates the level of confidence in the extraction of the problem descriptor from a description text contained in the target incident report and may be determined using NLP techniques well known in the arts. The description is continued assuming that PD1 and PD2 have the match weights of 0.6 and 0.3 for illustration.

Knowledge graph module 350 accordingly performs the knowledge graph traversal noted above starting from each of the start nodes closest to each of the extracted problem descriptors. For example, for PD1, start node 512 is identified as the closest start node and a first set of remediation actions represented by end nodes 552 and 553 are identified. For PD2, start node 511 is identified as the closest start node and a second set of remediation actions represented by end nodes 551 and 552 are identified. Knowledge graph module 350 then determines the confidence scores for each of the first set and second set of remediation action based on the confidence scores determined based on edge weights weighted by the respective match weights. For example, for node 553, the confidence score may be determined as 0.75 (based on edge weights)*0.6 (match weigh)=0.45. Knowledge graph module 350 then provides the identified (first and second) set of remediation actions along with the determined confidence scores to orchestrator 330 as a response to the query.

For long tail incidents, orchestrator 330 sends the details of the target incident to web search module 360, which generates and provides to orchestrator 330, new sets of remediation actions using web search techniques. Web search module 360 may perform one or more web searches via Internet 120 using the entities extracted from the target incident report, identify one or more web search results as new remediation actions and determine a confidence score associated with each remediation action based on the closeness of match (e.g., number of entities) in the web search result. Web search module 350 then provides the determined new set of remediation actions to orchestrator 330 as the results of the web search.

It should be noted that the classification into short head incident or a long tail incident provides an initial guidance to orchestrator 330 on whether to perform a knowledge graph traversal (for short head incidents) or a web search (for long tail incidents). However, orchestrator 330 may perform knowledge graph traversals for long tail incidents (for example, when the web search provides insufficient or low confidence score results) as well as web search for short tail incidents (for example, when the knowledge graph traversal provides insufficient or low confidence score results).

After determining the remediation actions from either one or both of knowledge graph module 350 and web search module 360, orchestrator 330 may forward the results (sets of remediation actions) to blender/re-ranker 380 for ranking of the results. The manner in which the remediation actions are ranked and thereafter provided to end users is described below with examples.

9. Ranking and Providing Remediation Actions

Blender/Re-ranker 380 receives the remediation actions from the different modules and then re-ranks them based on the confidence scores and prior (user) feedback. Blender/re-ranker 380 may employ various ranking techniques such as RankBoost, RankSVM, LambdaRank, etc. using the NDCG loss function. In one embodiment, blender/re-ranker 380 receives (via path 112) feedback on the recommendations/remediation actions previously provided to end users such as administrators/SREs. The feedback may be in the form of up-votes and down-votes for each remediation action—an up-vote indicating that the remediation action resolved the incident and a down-vote indicating that the remediation action had not or only partially resolved the incident. Blender/re-ranker 380 may also send to knowledge graph module 350, the feedback received from the end users to enable knowledge graph module 350 to update (for example, change the edge weights) the knowledge graph (500).

Figure 6C:
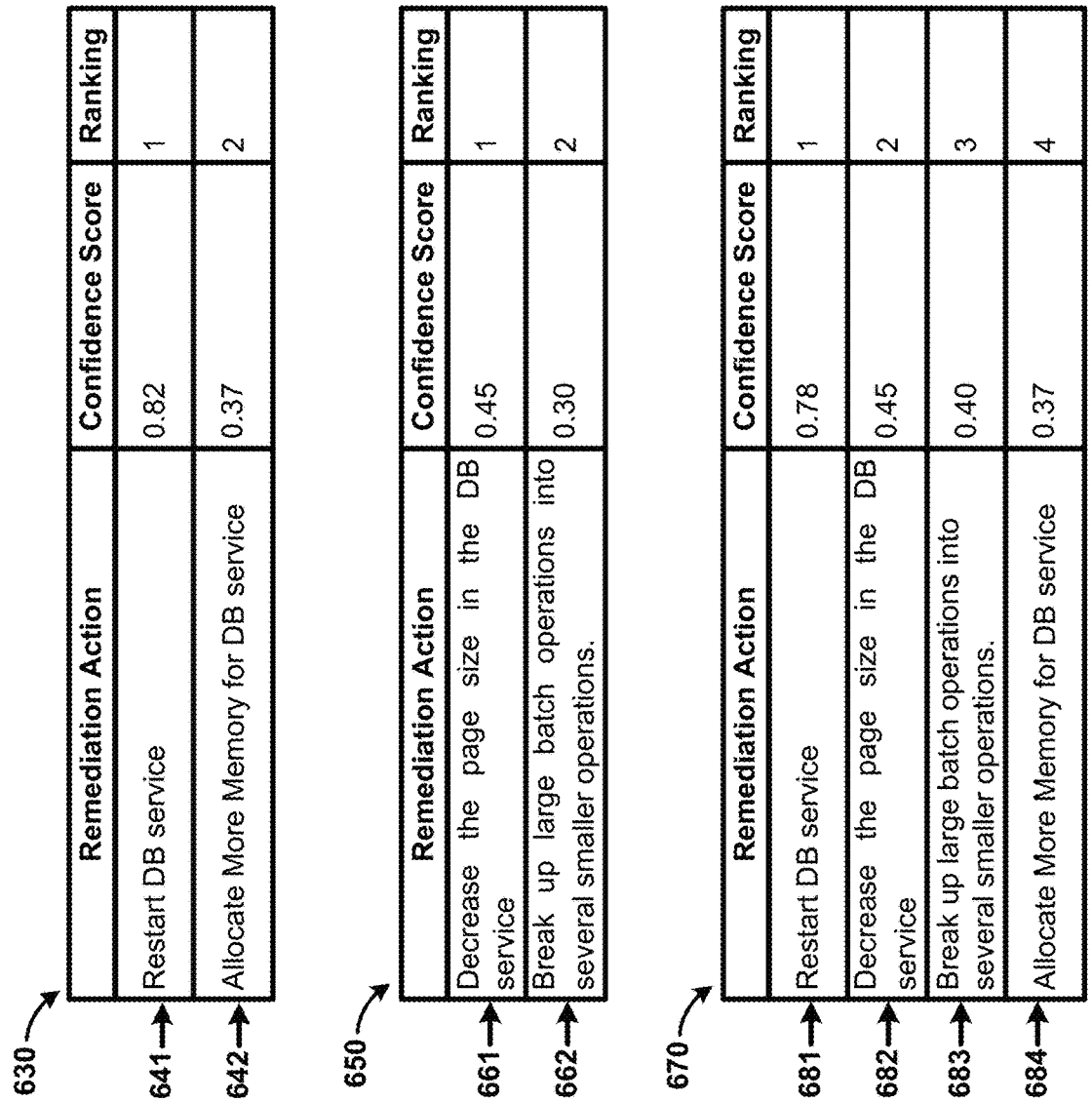
FIG. 6C illustrates the manner in which remediation actions are recommended for an incident report in one embodiment.

FIG. 6C illustrates the manner in which remediation actions are recommended for an incident report in one embodiment. In particular, FIG. 6C illustrates the recommendation for the (target) incident report shown in FIG. 6A. Table 630 is the set of remediation actions (rows 641-642) determined by knowledge graph module 350 based on traversal of knowledge graph 500, while table 650 is the new set of remediation actions (rows 661-662) determined by web search module 350 using web search techniques. It may be noted that each of the remediation actions in rows 641-642 and 661-662 is shown associated with a corresponding confidence score and a corresponding ranking (based on the confidence scores).

Table 670 is the combined/final set of remediation actions (681-684) rows determined by blender/re-ranker 380 based on the remediations actions of tables 630 and 650 and end user feedback on the previous recommendations. It may be observed from table 670, that the confidence score of the remediation action in row 662/683 has been modified from "0.30" to "0.40" based on the up-votes/feedback received from the end users. Also, the confidence score of the remediation action in row 641/681 has been modified from "0.82" to "0.78" based on the down-votes/feedback received from the end users. The final ranking in table 670 is performed based on the modified confidence scores.

Orchestrator 330 receives the final set of remediation actions and corresponding ranking from blender/re-ranker 380 and provides the final set of remediation actions to end users such as administrators/SREs (using one of end user systems 110). In the above example, the remediation actions of table 670 may be provided to end users as the recommendation for resolving the target incident. The end user may accordingly perform the recommended remediation actions and correspondingly fix/resolve the target incident.

Thus, recommendation system 150 provides a set of remediation actions along with confidence scores to remediate an incident identified generated by a PM/AIOps system. A knowledge graph based on historical remediation actions and feedback from end users (such as site reliability engineers (SREs)) is constructed. Upon receiving an incident report related to an incident, recommendation system 150 classifies the received incident into either a short head incident or a long tail incident. For a short head incident, recommendation system 150 determines remediation actions based on a traversal of the knowledge graph. For a long tail incident, recommendation system 150 generates new remediation actions using web search techniques. Recommendation system 150 then blends/combines the various remediation actions and re-ranks them to generate a final list of remediation actions along with confidence scores. The final list is then recommended to the end users, thereby enabling them to perform the appropriate remediation actions for fixing the incidents.

It may be appreciated that the aspects of the present disclosure recommend remediation actions for incidents identified by PM/AIOps systems. An IT manager (such as SRE) does not need to debug the problem and analyze metrics, logs, etc. and come up with a resolution by himself/herself which may take a long time. Instead, recommendation system 150 can automatically understand the nature of the problem and suggest a course of action which will remediate/resolve the problem. This will reduce the countless man hours wasted in debugging/triaging repetitive alerts and is of immense business value in AIOps.

It should be further appreciated that the features described above can be implemented in various embodiments as a desired combination of one or more of hardware, software, and firmware. The description is continued with respect to an embodiment in which various features are operative when the software instructions described above are executed.

10. Digital Processing System

Figure 7:
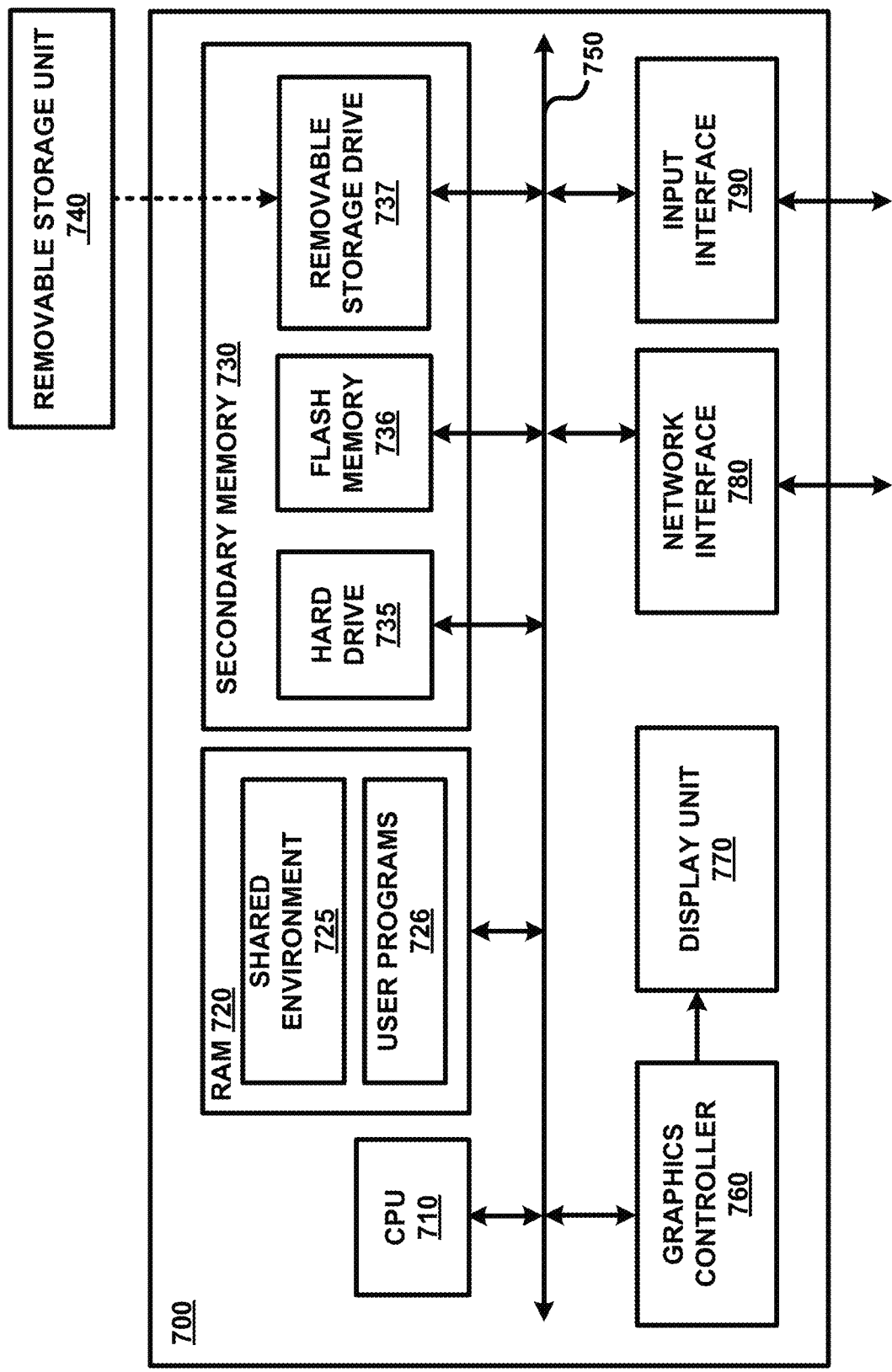
FIG. 7 is a block diagram illustrating the details of a digital processing system in which various aspects of the present disclosure are operative by execution of appropriate executable modules.

FIG. 7 is a block diagram illustrating the details of digital processing system (800) in which various aspects of the present disclosure are operative by execution of appropriate executable modules. Digital processing system 700 may correspond to recommendation system 150.

Digital processing system 700 may contain one or more processors such as a central processing unit (CPU) 710, random access memory (RAM) 720, secondary memory 730, graphics controller 760, display unit 770, network interface 780, and input interface 790. All the components except display unit 770 may communicate with each other over communication path 750, which may contain several buses as is well known in the relevant arts. The components of FIG. 7 are described below in further detail.

CPU 710 may execute instructions stored in RAM 720 to provide several features of the present disclosure. CPU 710 may contain multiple processing units, with each processing unit potentially being designed for a specific task. Alternatively, CPU 710 may contain only a single general-purpose processing unit.

RAM 720 may receive instructions from secondary memory 730 using communication path 750. RAM 720 is shown currently containing software instructions constituting shared environment 725 and/or other user programs 726 (such as other applications, DBMS, etc.). In addition to shared environment 725, RAM 720 may contain other software programs such as device drivers, virtual machines, etc., which provide a (common) run time environment for execution of other/user programs.

Graphics controller 760 generates display signals (e.g., in RGB format) to display unit 770 based on data/instructions received from CPU 710. Display unit 770 contains a display screen to display the images defined by the display signals. Input interface 790 may correspond to a keyboard and a pointing device (e.g., touch-pad, mouse) and may be used to provide inputs. Network interface 780 provides connectivity to a network (e.g., using Internet Protocol), and may be used to communicate with other systems connected to the networks.

Secondary memory 730 may contain hard drive 735, flash memory 736, and removable storage drive 737. Secondary memory 730 may store the data (e.g., data portions of FIGS. 4A-4C, 5 and 6A-6C) and software instructions (e.g., for implementing the steps of FIG. 2, the blocks of FIG. 2), which enable digital processing system 700 to provide several features in accordance with the present disclosure. The code/instructions stored in secondary memory 730 may either be copied to RAM 720 prior to execution by CPU 710 for higher execution speeds, or may be directly executed by CPU 710.

Some or all of the data and instructions may be provided on removable storage unit 740, and the data and instructions may be read and provided by removable storage drive 737 to CPU 710. Removable storage unit 740 may be implemented using medium and storage format compatible with removable storage drive 737 such that removable storage drive 737 can read the data and instructions. Thus, removable storage unit 740 includes a computer readable (storage) medium having stored therein computer software and/or data. However, the computer (or machine, in general) readable medium can be in other forms (e.g., non-removable, random access, etc.).

In this document, the term "computer program product" is used to generally refer to removable storage unit 740 or hard disk installed in hard drive 735. These computer program products are means for providing software to digital processing system 700. CPU 710 may retrieve the software instructions, and execute the instructions to provide various features of the present disclosure described above.

The term "storage media/medium" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage memory 730. Volatile media includes dynamic memory, such as RAM 720. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1050. Transmission media can also take the form of acoustic or light waves, such as those generated during radio-wave and infra-red data communications.

Reference throughout this specification to "one embodiment", "an embodiment", or similar language means that a particular feature, structure, or characteristic described in connection with the embodiment is included in at least one embodiment of the present disclosure. Thus, appearances of the phrases "in one embodiment", "in an embodiment" and similar language throughout this specification may, but do not necessarily, all refer to the same embodiment.

Furthermore, the described features, structures, or characteristics of the disclosure may be combined in any suitable manner in one or more embodiments. In the above description, numerous specific details are provided such as examples of programming, software modules, user selections, network transactions, database queries, database structures, hardware modules, hardware circuits, hardware chips, etc., to provide a thorough understanding of embodiments of the disclosure.

11. Conclusion

While various embodiments of the present disclosure have been described above, it should be understood that they have been presented by way of example only, and not limitation. Thus, the breadth and scope of the present disclosure should not be limited by any of the above-described exemplary embodiments, but should be defined only in accordance with the following claims and their equivalents.

It should be understood that the figures and/or screen shots illustrated in the attachments highlighting the functionality and advantages of the present disclosure are presented for example purposes only. The present disclosure is sufficiently flexible and configurable, such that it may be utilized in ways other than that shown in the accompanying figures.

Further, the purpose of the following Abstract is to enable the Patent Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the present disclosure in any way.

What is claimed is:

1. A non-transitory machine-readable medium storing one or more sequences of instructions, wherein execution of said one or more instructions by one or more processors contained in a digital processing system cause said digital processing system to recommend remediation actions, said one or more sequences of instructions comprises: an entity extractor for receiving a plurality of incident reports related to incidents identified by a performance management system, each incident report containing a corresponding problem descriptor for that incident, a remediation action performed for resolving that incident, and a set of qualifier entities associated with the incident, wherein said plurality of incident reports together contain a set of problem descriptors and a set of remediation actions; a knowledge graph module for constructing based on said plurality of incident reports, a knowledge graph that co-relates each of said set of problem descriptors with each of said set of remediation actions, wherein each of said set of problem descriptors is represented as a corresponding start node and each of said set of remediation actions is represented as a corresponding end node in said knowledge graph, wherein a set of qualifier entities in each incident report is represented as causal links between the start node and the end node corresponding to the problem descriptor and remediation action contained in the incident report, said knowledge graph module storing said knowledge graph in a memory provided in said digital processing system; said entity extractor, upon receiving a first incident report related to a first incident identified by said performance management system, extracting from said first incident report, a first problem descriptor and a first set of qualifier entities; said knowledge graph module for traversing said knowledge graph stored in said memory starting from a first start node corresponding to said first problem descriptor using said first set of qualifier entities to determine end nodes representing a first set of remediation actions; an orchestrator for causing resolution of said first incident based on one or more remediation actions of said first set of remediation actions, and upon resolution of said first incident, said knowledge graph module updating said knowledge graph in said memory based on said first incident to form an updated knowledge graph, wherein said updated knowledge graph is stored in said memory and used for resolving a later incident report received after resolution of said first incident report, wherein each of said entity extractor, said knowledge graph module, and said orchestrator is constituted of a corresponding set of software instructions.

2. The non-transitory machine-readable medium of claim 1, wherein said knowledge graph module maintains a respective confidence score associated with each path from said first problem descriptor to each remediation action of said first set of remediation actions, wherein the confidence score for a path represents a likelihood of resolution of said first problem descriptor by the corresponding remediation action, wherein said one or more sequences of instructions further comprises: a blender module for identifying rankings for said first set of remediation actions based on the associated confidence scores, wherein said orchestrator uses said rankings along with said first set of remediation actions to cause resolution of said first incident, wherein said blender module is constituted of a corresponding set of software instructions.

3. The non-transitory machine-readable medium of claim 2, wherein said entity extractor extracts a second problem descriptor with a second weight along with said first problem descriptor with a first weight,
wherein said knowledge graph module determines a second set of remediation actions and associated confidence scores for said second problem descriptor,
wherein said blender module identifies rankings for both of said first set of remediation actions and said second set of remediation actions together based on associated confidence scores weighted by the respective said first weight and said second weight,
wherein said updating comprises adding one or more problem descriptors of said first incident report as corresponding start nodes and each of said one or more remediation actions as respective end nodes in said knowledge graph to form said updated knowledge graph.

4. The non-transitory machine-readable medium of claim 1, said one or more sequences of instructions comprising a classification engine for: classifying said first incident as being one of a short head incident and a long tail incident; if said first incident is classified as said short head incident, said orchestrator using said first set of remediation actions for resolving said first incident; and if said first incident is classified as said long tail incident, said one or more sequences of instructions comprising a web search module for performing a web search to determine a third set of remediation actions, wherein said orchestrator uses said third set of remediation actions for resolving said first incident, wherein each of said web search module and said classification engine is constituted of a corresponding set of software instructions.

5. The non-transitory machine-readable medium of claim 4, wherein said classification engine comprises one or more instructions for:
generating a machine learning (ML) model correlating a set of problem types contained in said plurality of incident reports to a number of occurrences of each problem type in said knowledge graph; and
predicting using said ML model, whether said first incident is one of said short head incident and said long tail incident based on a first problem type determined for said first incident.

6. The non-transitory machine-readable medium of claim 4, said orchestrator further comprising one or more instructions for combining said first set of remediation actions and said third set of remediation actions to generate a final set of remediation actions,
wherein said orchestrator uses said final set of remediation actions for resolving said first incident.

7. The non-transitory machine-readable medium of claim 1, wherein said first problem descriptor is one of a root cause of said first incident and a symptom caused by said first incident,
wherein said first set of qualifier entities includes one or more of a performance metric associated with said first incident, a component of an application where said first incident occurred, a sub-component of said application where said first incident occurred, a location of a server hosting said component, and a problem type determined for said first incident,
wherein said first set of qualifier entities also includes said symptom when said problem descriptor is said root cause, and said root cause when said problem descriptor is said symptom.

8. A computer-implemented method for recommending remediation actions, the method comprising: receiving, by an entity extractor, a first incident report related to a first incident identified by a performance management system; extracting, by said entity extractor, from said first incident report, a first problem descriptor and a first set of qualifier entities; traversing, by a knowledge graph module, a knowledge graph stored in a memory to determine a first set of remediation actions, wherein said knowledge graph co-relates each of a set of problem descriptors with each of a set of remediation actions, wherein said set of problem descriptors and said set of remediation actions are contained in a plurality of incident reports previously received from said performance management system, wherein each of said set of problem descriptors is represented as a corresponding start node and each of said set of remediation actions is represented as a corresponding end node in said knowledge graph, wherein a set of qualifier entities in each incident report is represented as causal links between the start node and the end node corresponding to the problem descriptor and remediation action contained in the incident report, wherein said traversing starts from a first start node corresponding to said first problem descriptor and uses said first set of qualifier entities to determine end nodes representing said first set of remediation actions; causing, by an orchestrator, resolution of said first incident based on one or more remediation actions of said first set of remediation actions, and upon resolution of said first incident, said knowledge graph module updating said knowledge graph in said memory based on said first incident to form an updated knowledge graph, wherein said updated knowledge graph is stored in said memory and used for resolving a later incident report received after resolution of said first incident report, wherein each of said entity extractor, said knowledge graph module, and said orchestrator is constituted of a corresponding set of software instructions.

9. The method of claim 8, further comprising: maintaining, by said knowledge graph module, a respective confidence score associated with each path from said first problem descriptor to each remediation action of said first set of remediation actions, wherein the confidence score for a path represents a likelihood of resolution of said first problem descriptor by the corresponding remediation action; and identifying, by a blender module, rankings for said first set of remediation actions based on the associated confidence scores, wherein said orchestrator uses said rankings along with said first set of remediation actions to cause resolution of said first incident, wherein said blender module is constituted of a corresponding set of software instructions.

10. The method of claim 9, wherein said extracting extracts a second problem descriptor with a second weight along with said first problem descriptor with a first weight,
   wherein said traversing determines a second set of remediation actions and associated confidence scores for said second problem descriptor,
   wherein said identifying identifies rankings for both of said first set of remediation actions and said second set of remediation actions together based on associated confidence scores weighted by the respective said first weight and said second weight,
   wherein said updating comprises adding one or more problem descriptors of said first incident report as corresponding start nodes and each of said one or more remediation actions as respective end nodes in said knowledge graph to form said updated knowledge graph.

11. The method of claim 8, further comprising: classifying, by a classification engine, said first incident as being one of a short head incident and a long tail incident; if said first incident is classified as said short head incident, said orchestrator using said first set of remediation actions for resolving said first incident; and if said first incident is classified as said long tail incident, said method further comprising performing, by a web search module, a web search to determine a third set of remediation actions, wherein said orchestrator uses said third set of remediation actions for resolving said first incident, wherein each of said web search module and said classification engine is constituted of a corresponding set of software instructions.

12. The method of claim 11, wherein said classifying comprises:
   generating a machine learning (ML) model correlating a set of problem types contained in said plurality of incident reports to a number of occurrences of each problem type in said knowledge graph; and
   predicting using said ML model, whether said first incident is one of said short head incident and said long tail incident based on a first problem type determined for said first incident.

13. The method of claim 11, further comprising combining said first set of remediation actions and said third set of remediation actions to generate a final set of remediation actions,
   wherein said orchestrator uses said final set of remediation actions for resolving said first incident.

14. The method of claim 8, wherein said first problem descriptor is one of a root cause of said first incident and a symptom caused by said first incident,
   wherein said first set of qualifier entities includes one or more of a performance metric associated with said first incident, a component of an application where said first incident occurred, a sub-component of said application where said first incident occurred, a location of a server hosting said component, and a problem type determined for said first incident,
   wherein said first set of qualifier entities also includes said symptom when said problem descriptor is said root cause, and said root cause when said problem descriptor is said symptom.

15. A digital processing system comprising: a random access memory (RAM) to store instructions for recommending remediation actions; and one or more processors to retrieve and execute the instructions, wherein execution of the instructions causes the digital processing system to perform the actions of: receiving, by an entity extractor, a plurality of incident reports related to incidents identified by a performance management system, each incident report containing a corresponding problem descriptor for that incident, a remediation action performed for resolving that incident, and a set of qualifier entities associated with the incident, wherein said plurality of incident reports together contain a set of problem descriptors and a set of remediation actions; constructing, by a knowledge graph module, based on said plurality of incident reports, a knowledge graph that co-relates each of said set of problem descriptors with each of said set of remediation actions, wherein each of said set of problem descriptors is represented as a corresponding start node and each of said set of remediation actions is represented as a corresponding end node in said knowledge graph, wherein a set of qualifier entities in each incident report is represented as causal links between the start node and the end node corresponding to the problem descriptor and remediation action contained in the incident report; storing, by said knowledge graph, in a memory provided in said digital processing system; upon receiving a first incident report related to a first incident identified by said performance management system, extracting, by said entity extractor, from said first incident report, a first problem descriptor and a first set of qualifier entities; traversing, by said knowledge graph module, said knowledge graph starting from a first start node corresponding to said first problem descriptor using said first set of qualifier entities to determine end nodes representing a first set of remediation actions; causing, by an orchestrator, resolution of said first incident based on one or more remediation actions of said first set of remediation actions, and upon resolution of said first incident, said knowledge graph module updating said knowledge graph in said memory based on said first incident to form an updated knowledge graph, wherein said updated knowledge graph is stored in said memory and used for resolving a later incident report received after resolution of said first incident report, wherein each of said entity extractor, said knowledge graph module, and said orchestrator is constituted of a corresponding set of software instructions.

16. The digital processing system of claim 15, further performing the actions of: maintaining, by said knowledge graph module, a respective confidence score associated with each path from said first problem descriptor to each remediation action of said first set of remediation actions, wherein the confidence score for a path represents a likelihood of resolution of said first problem descriptor by the corresponding remediation action; and identifying, by a blender module, rankings for said first set of remediation actions based on the associated confidence scores, wherein said digital processing system also uses said rankings along with said first set of remediation actions to cause resolution of said first incident, wherein said blender module is constituted of a corresponding set of software instructions.

17. The digital processing system of claim 16, wherein said digital processing system extracts a second problem descriptor with a second weight along with said first problem descriptor with a first weight, wherein said traversing determines a second set of remediation actions and associated confidence scores for said second problem descriptor, wherein said digital processing system identifies rankings for both of said first set of remediation actions and said second set of remediation actions together based on associated confidence scores weighted by the respective said first weight and said second weight, wherein for said updating, said digital processing system performs the actions of adding one or more problem descriptors of said first incident report as corresponding start nodes and each of said one or more remediation actions as respective end nodes in said knowledge graph to form said updated knowledge graph.

18. The digital processing system of claim 15, further performing the actions of: classifying, by a classification engine, said first incident as being one of a short head incident and a long tail incident; if said first incident is classified as said short head incident, said digital processing system using said first set of remediation actions for resolving said first incident; and if said first incident is classified as said long tail incident, further performing the actions of performing, by a web search module, a web search to determine a third set of remediation actions, wherein said digital processing system uses said third set of remediation actions for resolving said first incident, wherein each of said web search module and said classification engine is constituted of a corresponding set of software instructions.

19. The digital processing system of claim 18, wherein for said classifying, said digital processing system performs the actions of:

generating a machine learning (ML) model correlating a set of problem types contained in said plurality of incident reports to a number of occurrences of each problem type in said knowledge graph; and predicting using said ML model, whether said first incident is one of said short head incident and said long tail incident based on a first problem type determined for said first incident.

20. The digital processing system of claim 18, further performing the actions of combining said first set of remediation actions and said third set of remediation actions to generate a final set of remediation actions, wherein said digital processing system uses said final set of remediation actions for resolving said first incident.

* * * * *